US011343478B2

(12) United States Patent
Kashiwagi et al.

(10) Patent No.: US 11,343,478 B2
(45) Date of Patent: *May 24, 2022

(54) METHOD OF CONTROLLING A DISPLAY SYSTEM INCLUDING A PLURALITY OF PROJECTORS AND CONTROL DEVICE

(71) Applicant: SEIKO EPSON CORPORATION, Tokyo (JP)

(72) Inventors: Akihiro Kashiwagi, Azumino (JP); Hiroyuki Ichieda, Matsumoto (JP); Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,754

(22) Filed: Oct. 30, 2020

(65) Prior Publication Data
US 2021/0136339 A1 May 6, 2021

(30) Foreign Application Priority Data
Oct. 31, 2019 (JP) .............................. JP2019-198464

(51) Int. Cl.
*H04N 9/31* (2006.01)

(52) U.S. Cl.
CPC ......... *H04N 9/3182* (2013.01); *H04N 9/3147* (2013.01); *H04N 9/3191* (2013.01)

(58) Field of Classification Search
CPC .. H04N 9/3147; H04N 9/3191; H04N 9/3182; H04N 9/3185; H04N 9/3194; H04N 9/3179

See application file for complete search history.

(56) References Cited

U.S. PATENT DOCUMENTS

| 6,340,976 B1 * | 1/2002 | Oguchi ................ H04N 9/3147 345/22 |
| 2004/0227908 A1 | 11/2004 | Wada et al. |
| 2005/0110959 A1 | 5/2005 | Miyazawa et al. |

(Continued)

FOREIGN PATENT DOCUMENTS

| JP | 2004-336225 | 11/2004 |
| JP | 2007-300539 | 11/2007 |

(Continued)

*Primary Examiner* — John W Miller
*Assistant Examiner* — Humam M Satti
(74) *Attorney, Agent, or Firm* — Dority & Manning, P.A.

(57) ABSTRACT

A method of controlling a display system including the steps of projecting, by a plurality of group-belonging projectors, an image in one display area corresponding to one projector group to thereby display one composite image corresponding to the one projector group out of a plurality of composite images corresponding one-to-one to a plurality of projector groups in the one display area, estimating, by a control device, brightness of the plurality of composite images, identifying, by the control device, a dark image which is the darkest and a first adjustment target image different from the dark image from the plurality of composite images based on a result of the brightness estimation, and controlling, by the control device, at least one projector in the projector group corresponding to the first adjustment target image to thereby approximate brightness of the first adjustment target image to brightness of the dark image.

14 Claims, 10 Drawing Sheets

(56) References Cited

U.S. PATENT DOCUMENTS

| | | | |
|---|---|---|---|
| 2007/0103599 A1* | 5/2007 | Wen-Chin | H04N 21/4131 |
| | | | 348/687 |
| 2011/0309999 A1 | 12/2011 | Chang et al. | |
| 2013/0016118 A1 | 1/2013 | Mizushiro | |
| 2013/0307755 A1* | 11/2013 | Tomita | H04N 9/317 |
| | | | 345/1.1 |
| 2015/0138222 A1* | 5/2015 | Imaizumi | G03B 21/00 |
| | | | 345/589 |
| 2019/0028685 A1* | 1/2019 | Kaji | G06T 7/74 |

FOREIGN PATENT DOCUMENTS

| | | |
|---|---|---|
| JP | 2008-151838 | 7/2008 |
| JP | 2012-517621 | 8/2012 |
| JP | 2013-020056 | 1/2013 |
| JP | 2013-085182 | 5/2013 |
| JP | 2017-223718 | 12/2017 |
| WO | WO2005/036874 | 4/2005 |

* cited by examiner

FIG. 2

| COMPOSITE IMAGE | DISPLAY AREA | PROJECTOR GROUP | GROUP-BELONGING PROJECTOR | PARTIAL IMAGE (DIVISIONAL IMAGE) | GROUP-BELONGING PROJECTOR | PARTIAL IMAGE (DIVISIONAL IMAGE) |
|---|---|---|---|---|---|---|
| FIRST COMPOSITE IMAGE E1 | FIRST AREA 31 | FIRST PROJECTOR GROUP 101 | FIRST PROJECTOR 1A | FIRST PROJECTION IMAGE F1 | SECOND PROJECTOR 1B | SECOND PROJECTION IMAGE F2 |
| SECOND COMPOSITE IMAGE E2 | SECOND AREA 32 | SECOND PROJECTOR GROUP 102 | THIRD PROJECTOR 1C | THIRD PROJECTION IMAGE F3 | FOURTH PROJECTOR 1D | FOURTH PROJECTION IMAGE F4 |

| IMAGE | SITUATION IMAGE | COMPOSITE IMAGE |
|---|---|---|
| FIRST IMAGE | FIRST SITUATION IMAGE E11 | FIRST COMPOSITE IMAGE E1 DISPLAYED IN FIRST AREA 31 IN FIRST SITUATION |
| FIRST IMAGE | SECOND SITUATION IMAGE E22 | SECOND COMPOSITE IMAGE E2 DISPLAYED IN SECOND AREA 32 IN SECOND SITUATION |

FIG. 7

| SITUATION | CONTENT |
|---|---|
| FIRST SITUATION | FIRST PROJECTOR 1A AND SECOND PROJECTOR 1B PROJECT WHITE IMAGE BASED ON WHITE IMAGE SIGNAL REPRESENTING WHITE |
| SECOND SITUATION | THIRD PROJECTOR 1C AND FOURTH PROJECTOR 1D PROJECT WHITE IMAGE BASED ON WHITE IMAGE SIGNAL REPRESENTING WHITE |

FIG. 8

| IMAGE | BRIGHTNESS AND SO ON |
|---|---|
| DARK IMAGE | THE DARKEST OF FIRST SITUATION IMAGE E11 AND SECOND SITUATION IMAGE E22 |
| FIRST ADJUSTMENT TARGET IMAGE | DIFFERENT FROM DARK IMAGE OUT OF FIRST SITUATION IMAGE E11 AND SECOND SITUATION IMAGE E22 |
| SECOND ADJUSTMENT TARGET IMAGE | SHOWING VALUE OF COLOR DIFFERENT FROM THE AVERAGE IN THE PLURALITY OF SECOND IMAGES |

FIG. 9

| IMAGE | RED IMAGE | PROJECTION IMAGE |
|---|---|---|
| SECOND IMAGE | FIRST RED IMAGE F11 | FIRST PROJECTION IMAGE F1 PROJECTED IN FIRST AREA 31 IN THIRD SITUATION |
| SECOND IMAGE | SECOND RED IMAGE F22 | SECOND PROJECTION IMAGE F2 PROJECTED IN FIRST AREA 31 IN FOURTH SITUATION |
| SECOND IMAGE | THIRD RED IMAGE F33 | THIRD PROJECTION IMAGE F3 PROJECTED IN SECOND AREA 32 IN FIFTH SITUATION |
| SECOND IMAGE | FOURTH RED IMAGE F44 | FOURTH PROJECTION IMAGE F4 PROJECTED IN SECOND AREA 32 IN SIXTH SITUATION |

FIG. 10

| SITUATION | CONTENT |
|---|---|
| THIRD SITUATION | FIRST PROJECTOR 1A PROJECTS FIRST PROJECTION IMAGE F1 BASED ON RED IMAGE SIGNAL REPRESENTING SOLID RED |
| FOURTH SITUATION | SECOND PROJECTOR 1B PROJECTS SECOND PROJECTION IMAGE F2 BASED ON RED IMAGE SIGNAL |
| FIFTH SITUATION | THIRD PROJECTOR 1C PROJECTS THIRD PROJECTION IMAGE F3 BASED ON RED IMAGE SIGNAL |
| SIXTH SITUATION | FOURTH PROJECTOR 1D PROJECTS FOURTH PROJECTION IMAGE F4 BASED ON RED IMAGE SIGNAL |

METHOD OF CONTROLLING A DISPLAY SYSTEM INCLUDING A PLURALITY OF PROJECTORS AND CONTROL DEVICE

The present application is based on, and claims priority from JP Application Serial Number 2019-198464, filed Oct. 31, 2019, the disclosure of which is hereby incorporated by reference herein in its entirety.

BACKGROUND

1. Technical Field

The present disclosure relates to a method of controlling a display system, and a control device.

2. Related Art

In JP-A-2017-223718 (Document 1), there is described a projection system having projectors 100A through 100D.

This projection system superimposes an image projected by the projector 100A on an image projected by the projector 100B in a first projection area to thereby display a first stacked image. Further, this projection system superimposes an image projected by the projector 100C on an image projected by the projector 100D in a second projection area to thereby display a second stacked image. Further, by arranging the first stacked image and the second stacked image side by side, there is displayed a tiling image.

In the technology described in Document 1, when the images are different in brightness from each other in the situation in which the projectors 100A through 100D project the images based on a common image signal, there occurs an unevenness in brightness in the tiling image.

As a method of reducing the unevenness, it is possible to make the brightness of the image projected by each of the projectors 100A through 100D coincide with the brightness of the darkest image of the images projected by the projectors 100A through 100D.

However, in this case, the tiling image which has been adjusted becomes dark.

SUMMARY

A control method according to an aspect of the present disclosure is a method of controlling a display system including a plurality of projectors divided into a plurality of projector groups and a control device, the method including the steps of projecting, by a plurality of group-belonging projectors included in one projector group out of the plurality of projector groups, an image in one display area corresponding to the one projector group out of a plurality of display areas to thereby display one composite image corresponding to the one projector group out of a plurality of composite images corresponding one-to-one to the plurality of projector groups in the one display area, making, by the control device, the plurality of projectors project a first image to estimate brightness of each of the composite images, identifying, by the control device, a dark image which is darkest and a first adjustment target image different from the dark image from the plurality of composite images based on a result of the brightness estimation, and the control device controls at least one projector included in the projector group corresponding to the first adjustment target image out of the plurality of projector groups to thereby approximate brightness of the first adjustment target image to brightness of the dark image.

A control method according to another aspect of the present disclosure is a method of controlling a display system including a first projector, a second projector, a third projector, and a fourth projector, the method including the steps of projecting, by the first projector, a first projection image with first brightness in a first area based on a first image signal, projecting, by the second projector, a second projection image with second brightness in the first area based on the first image signal, projecting, by the third projector, a third projection image with third brightness in a second area based on the first image signal, projecting, by the fourth projector, a fourth projection image with fourth brightness in the second area based on the first image signal, displaying a first composite image in the first area with fifth brightness brighter than the first brightness and the second brightness with the first projection image and the second projection image, displaying a second composite image in the second area with sixth brightness brighter than the third brightness and the fourth brightness with the third projection image and the fourth projection image, projecting, by the first projector and the second projector, the first composite image with the sixth brightness when the sixth brightness is darker than the fifth brightness, and projecting, by the third projector and the fourth projector, the second composite image with the fifth brightness when the fifth brightness is darker than the sixth brightness.

A control device according to another aspect of the present disclosure is a control device configured to control a display system which includes a plurality of projectors divided into a plurality of projector groups, and in which a plurality of group-belonging projectors included in one projector group out of the plurality of projector groups projects an image in one display area corresponding to the one projector group out of a plurality of display areas to thereby display one composite image corresponding to the one projector group out of a plurality of composite images corresponding one-to-one to the plurality of projector groups in the one display area, the control device including an estimation section configured to make the plurality of projectors project a first image to estimate brightness of each of the composite images, an identification section configured to identify a dark image which is darkest and a first adjustment target image different from the dark image from the plurality of composite images based on a result of the brightness estimation, and a control section configured to control at least one projector included in the projector group corresponding to the first adjustment target image out of the plurality of projector groups to thereby approximate brightness of the first adjustment target image to brightness of the dark image.

BRIEF DESCRIPTION OF THE DRAWINGS

FIG. 2 is a diagram showing an example of a relationship between projectors, projection images, and display areas in the display system.

FIG. 7 is a diagram showing an example of a first situation and a second situation.

FIG. 8 is a diagram showing an example of a dark image and an adjustment target image.

FIG. 9 is a diagram showing an example of a second image.

FIG. 10 is a diagram showing an example of a third situation, a fourth situation, a fifth situation, and a sixth situation.

DESCRIPTION OF AN EXEMPLARY EMBODIMENT

A: First Embodiment

A1: Outline of Display System 1000

Figure 1:
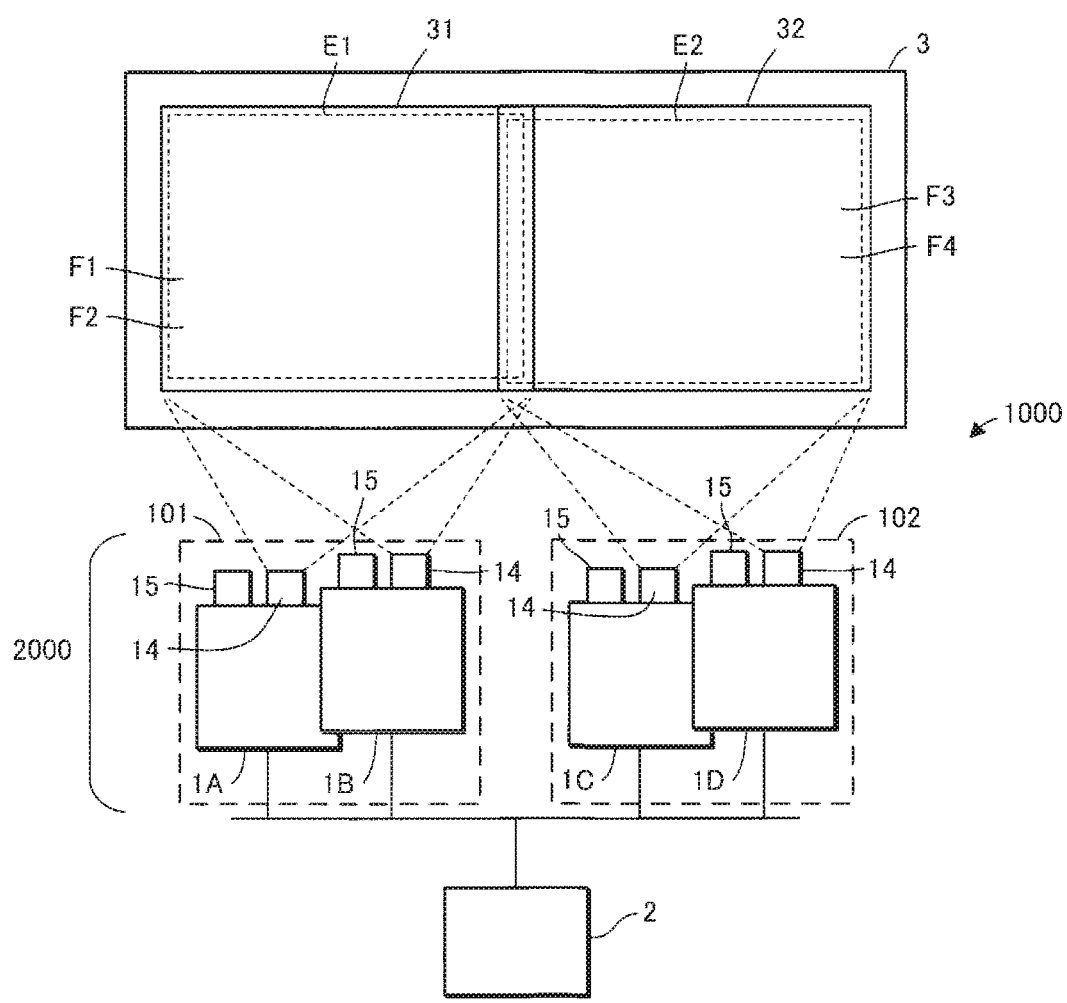
FIG. 1 is a diagram showing an example of a display system.
Figure 3:
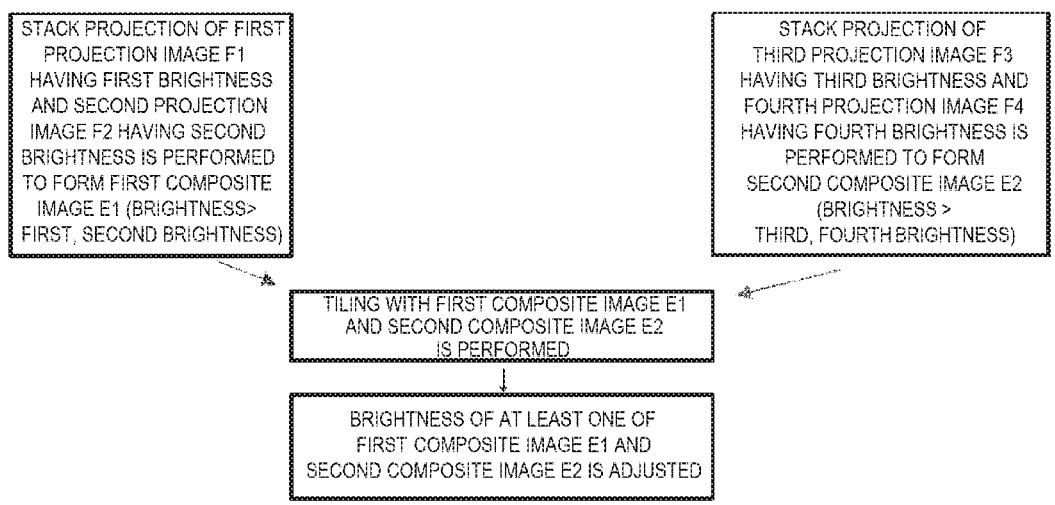
FIG. 3 is a diagram schematically showing an example of brightness adjustment control in tiling projection of composite images as a result of stack projection.

FIG. 1 is a diagram showing an example of a display system 1000. The display system 1000 includes a projection system 2000 and a control device 2. The projection system 2000 displays a first composite image E1 and a second composite image E2 on a display surface 3. The first composite image E1 and the second composite image E2 are an example of a plurality of composite images. The plurality of composite images is not limited to the two composite images. The plurality of composite images can be three or more composite images. The display surface 3 is, for example, a screen. The display surface 3 is not limited to the screen, but can also be, for example, a whiteboard, a wall, a ceiling, a floor, or a door. FIG. 2 is a diagram showing an example of a relationship between projectors, projection images, and display areas in the display system 1000. FIG. 3 is a diagram schematically showing control of stack projection and tiling projection. FIG. 3 shows that a brightness adjustment is performed on the first composite image E1 as a result of the stack projection and the second composite image E2 as a result of the stack projection in the tiling projection.

The projection system 2000 includes a first projector 1A through a fourth projector 1D. The first projector 1A through the fourth projector 1D are an example of the plurality of projectors. The plurality of projectors is not limited to the four projectors. The plurality of projectors can also be five or more projectors. The first projector 1A through the fourth projector 1D are divided into a first projector group 101 and a second projector group 102.

The first projector group 101 displays the first composite image E1 in a first area 31 on the display surface 3. The second projector group 102 displays the second composite image E2 in a second area 32 on the display surface 3. A part of the first area 31 overlaps a part of the second area 32. A part of the first area 31 is not required to overlap a part of the second area 32. The first projector group 101 corresponds to the first area 31. The second projector group 102 corresponds to the second area 32. The first area 31 and the second area 32 are an example of a plurality of display areas.

In FIG. 1, in order to make the distinction between the first composite image E1 and the second composite image E2 easy, the first composite image E1 is located inside the outer circumference in the first area 31, and the second composite image E2 is located inside the outer circumference in the second area 32 for the sake of convenience.

The first projector group 101 and the second projector group 102 are an example of the plurality of projector groups. The plurality of projector groups is not limited to the two projector groups, but can also be three or more projector groups. The plurality of projector groups corresponds one-to-one to the plurality of composite images. The first projector group 101 corresponds to the first composite image E1. The second projector group 102 corresponds to the second composite image E2.

The first projector group 101 includes the first projector 1A and the second projector 1B. The second projector group 102 includes the third projector 1C and the fourth projector 1D. The first projector 1A and the second projector 1B are an example of a plurality of group-belonging projectors. The third projector 1C and the fourth projector 1D are an example of the plurality of group-belonging projectors. It is possible for each of the first projector group 101 and the second projector group 102 to include three or more projectors.

The first projector 1A through the fourth projector 1D are the same in configuration as each other. It should be noted that the first projector 1A through the fourth projector 1D are not required to be the same in configuration as each other. Hereinafter, when there is no need to distinguish the first projector 1A through the fourth projector 1D from each other, these projectors are referred to as "projectors 1."

The first projector 1A projects a first projection image F1 in the first area 31. The second projector 1B projects a second projection image F2 in the first area 31. The third projector 1C projects a third projection image F3 in the second area 32. The fourth projector 1D projects a fourth projection image F4 in the second area 32.

The content of the first projection image F1 is the same as the content of the second projection image F2. In other words, the first projection image F1 is the same as the second projection image F2. The content of the third projection image F3 is the same as the content of the fourth projection image F4. In other words, the third projection image F3 is the same as the fourth projection image F4.

Apart of the first projection image F1 overlaps a part of the third projection image F3. A part of the second projection image F2 overlaps a part of the fourth projection image F4. A part of the third projection image F3 overlaps a part of the first projection image F1. A part of the fourth projection image F4 overlaps a part of the second projection image F2.

On the part overlapping the third projection image F3 in the first projection image F1, there is performed a so-called edge blending process. The edge blending process means a process of performing a dimming process in an overlapping area overlapping another projection image in the projection image to thereby reduce a difference in brightness between the overlapping area and a non-overlapping area.

The edge blending process is also performed on a part overlapping the fourth projection image F4 in the second projection image F2, a part overlapping the first projection image F1 in the third projection image F3, and a part overlapping the second projection image F2 in the fourth projection image F4.

It should be noted that a part of the first area 31 is not required to overlap a part of the second area 32.

In this case, the edge blending process is not performed in the first projection image F1 through the fourth projection image F4.

The first composite image E1 is formed of the first projection image F1 and the second projection image F2. In the first composite image E1, the first projection image F1 and the second projection image F2 are located in a common area. In the first composite image E1, the first projection image F1 overlaps the second projection image F2.

The second composite image E2 is formed of the third projection image F3 and the fourth projection image F4. In the second composite image E2, the third projection image F3 and the fourth projection image F4 are located in a common area. In the second composite image E2, the third projection image F3 overlaps the fourth projection image F4.

The first composite image E1 and the second composite image E2 are located in respective areas different from each other on the display surface 3.

The control device 2 is, for example, a PC (Personal Computer). The control device 2 is not limited to the PC, but can also be, for example, a tablet terminal or a smartphone.

The control device 2 can also be a device to be installed in any one of the first projector 1A through the fourth projector 1D. In this case, the projector equipped with the control device 2 out of the first projector 1A through the fourth projector 1D can be referred to as a "master projector."

The control device 2 communicates with each of the first projector 1A through the fourth projector 1D via, for example, a wired LAN (Local Area Network). The communication format between the control device 2 and the first projector 1A through the fourth projector 1D is not limited to the wired LAN, but can also be, for example, a wireless LAN or Bluetooth. Bluetooth is a registered trademark. The control device 2 controls the projection system 2000.

A2: One Example of Projector 1

Figure 4:
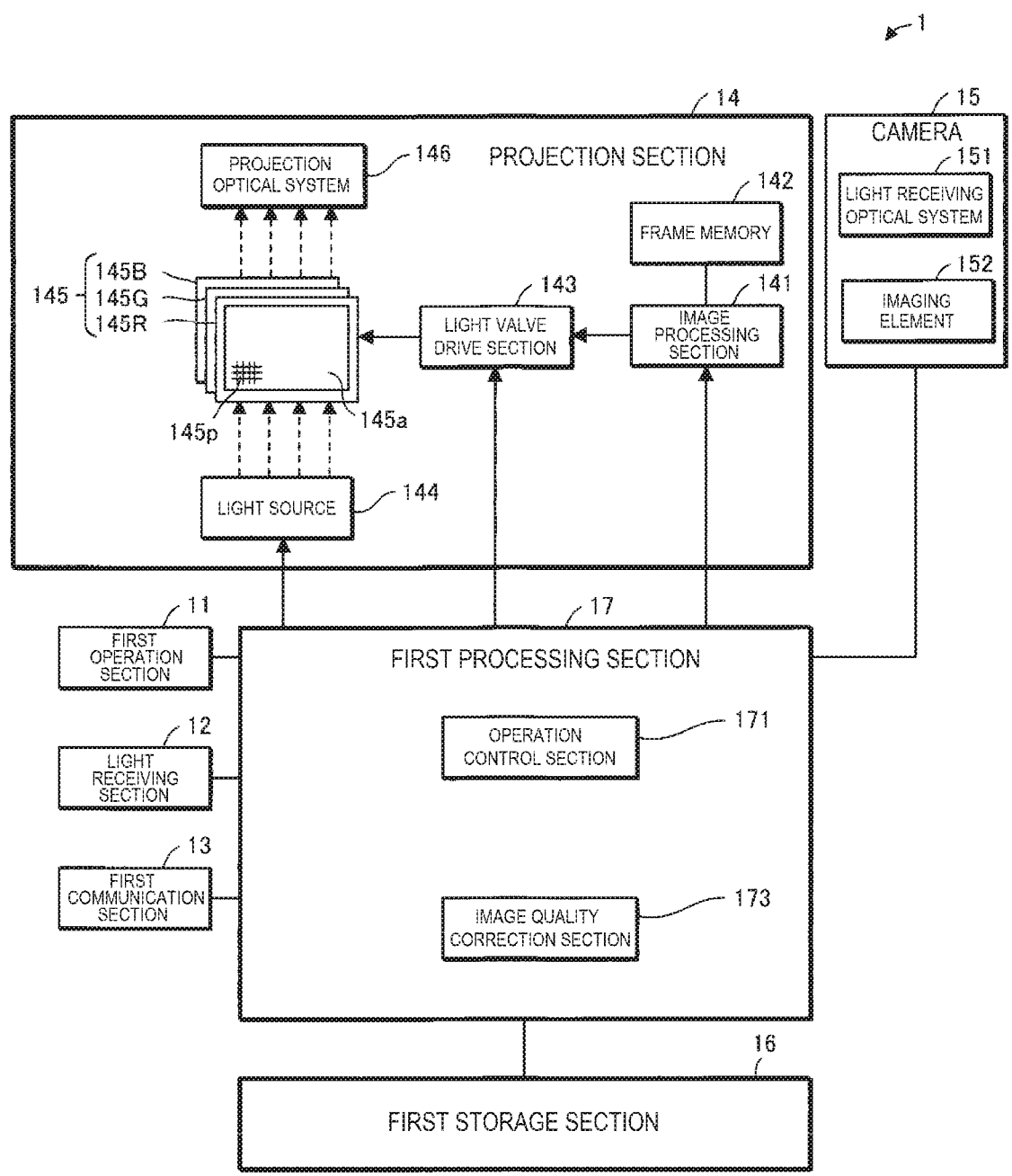
FIG. 4 is a diagram showing an example of a projector.

FIG. 4 is a diagram showing an example of the projector 1. The projector 1 includes a first operation section 11, a light receiving section 12, a first communication section 13, a projection section 14, a camera 15, a first storage section 16, and a first processing section 17.

The first operation section 11 corresponds to, for example, a variety of operating buttons, operating keys, or a touch panel. The first operation section 11 is provided to a housing of the projector 1. The first operation section 11 receives an input operation by the user.

The light receiving section 12 receives an infrared signal based on the input operation to a remote controller not shown from the remote controller. The remote controller is provided with a variety of operating buttons, operating keys, or a touch panel for receiving the input operation.

The first communication section 13 communicates with the control device 2. The communication format between the first communication section 13 and the control device 2 is the wired LAN as described above. It should be noted that the communication format between the first communication section 13 and the control device 2 is not limited to the wired LAN.

The projection section 14 projects an image on the display surface 3 to thereby display the image on the display surface 3. The projection section 14 includes an image processing section 141, a frame memory 142, a light valve drive section 143, a light source 144, a red-color liquid crystal light valve 145R, a green-color liquid crystal light valve 145G, a blue-color liquid crystal light valve 145B, and a projection optical system 146. Hereinafter, when there is no need to distinguish the red-color liquid crystal light valve 145R, the green-color liquid crystal light valve 145G, and the blue-color liquid crystal light valve 145B from each other, these are referred to as "liquid crystal light valves 145."

The image processing section 141 is formed of a circuit such as a single image processor or a plurality of image processors. The image processing section 141 receives an image signal form, for example, the first processing section 17. It is also possible for the image processing section 141 to receive the image signal from an image supply device. The image supply device is, for example, the control device 2. The image supply device can also be a device different from the control device 2. The device different from the control device 2 is, for example, a PC. The image supply device is not limited to the PC, but can also be, for example, a tablet terminal, a smartphone, a video reproduction device, a DVD (Digital Versatile Disc) player, a Blu-ray disc player, a hard disk recorder, a television tuner device, or a video game device.

The image processing section 141 develops the image signal on the frame memory 142. The frame memory 142 is formed of a storage device such as a RAM (Random Access Memory). The image processing section 141 performs image processing on the image signal having been developed on the frame memory 142 to thereby generate a drive signal.

The image processing executed by the image processing section 141 includes, for example, a geometric correction process for correcting a keystone distortion of the image to be projected by the projection section 14. It is also possible for the image processing section 141 to execute other image processing such as a resolution conversion process in addition to the geometric correction process. In the resolution conversion process, the image processing section 141 converts the resolution of the image represented by the image signal into, for example, the resolution of the liquid crystal light valves 145. The other image processing is not limited to the resolution conversion process. The other image processing can be, for example, an OSD (On-Screen Display) process of superimposing an OSD image on the image represented by the image signal provided from the image supply device. The other image processing can also be so-called gamma processing of executing the gamma correction.

The light valve drive section 143 is formed of a circuit such as a driver. The light valve drive section 143 generates drive voltages based on the drive signal provided from the image processing section 141. The light valve drive section 143 applies the drive voltages to the liquid crystal light valves 145 to thereby drive the liquid crystal light valves 145.

The light source 144 is, for example, an LED (light emitting diode). The light source 144 is not limited to the LED, but can also be, for example, a xenon lamp, a super-high pressure mercury lamp, or a laser source. The light source 144 emits the light. The light emitted from the light source 144 enters an integrator optical system not shown. The integrator optical system reduces the unevenness in luminance distribution in the incident light. The light emitted from the light source 144 passes through the integrator optical system, and is then separated by a color separation optical system not shown into colored light components of red, green, and blue as the three primary colors of light. The red colored light component enters the red-color liquid crystal light valve 145R. The green colored light component enters the green-color liquid crystal light valve 145G. The blue colored light component enters the blue-color liquid crystal light valve 145B.

The liquid crystal light valves 145 are each formed of a liquid crystal panel having a liquid crystal material existing between a pair of transparent substrates, and so on. The liquid crystal light valves 145 each have a pixel area 145*a* having a rectangular shape and including a plurality of pixels 145*p* arranged in a matrix. In each of the liquid crystal light valves 145, a drive voltage based on the image signal is applied to the liquid crystal for each of the pixels 145*p*. When the light valve drive section 143 applies the drive voltages to the respective pixels 145*p*, the light transmittance of each of the pixels 145*p* is set to the light transmittance based on the drive voltage. The light emitted from the light source 144 passes through the pixel area 145*a* to thereby be modulated. Therefore, the image based on the image signal is formed for each colored light. The liquid crystal light valves 145 are an example of a light modulation device.

The images of the respective colors are combined by a color combining optical system not shown for each of the pixels 145*p*. Therefore, a color image is generated. The color image is projected via the projection optical system 146. The projection optical system 146 is a projection lens which can be shifted. The projection optical system 146 is shifted by a lens shift mechanism not shown. Due to the shift of the projection optical system 146, the position in the display surface 3 of the image to be projected from the projection optical system 146 is displaced. Furthermore, the displacement of the image in the display surface 3 is determined by the shift amount of the projection optical system 146.

The camera 15 includes a light receiving optical system 151 such as a lens, and an imaging element 152 for converting the light collected by the light receiving optical system 151 into an electric signal. The imaging element 152 is, for example, a CCD (Charge Coupled Device) image sensor for receiving the light in, for example, an infrared region and a visible light region. The imaging element 152 is not limited to the CCD image sensor, but can also be a CMOS (Complementary Metal Oxide Semiconductor) image sensor for receiving the light in, for example, the infrared region and the visible light region.

The camera 15 images the display surface 3 to thereby generate imaging data. For example, the camera 15 takes the first composite image E1 displayed on the display surface 3 to thereby generate first composite image imaging data. Further, the camera 15 takes the second composite image E2 displayed on the display surface 3 to thereby generate second composite image imaging data.

In the present embodiment, the camera 15 of the first projector 1A takes the first composite image E1 displayed on the display surface 3 to thereby generate the first composite image imaging data. The camera 15 of the third projector 1C takes the second composite image E2 displayed on the display surface 3 to thereby generate the second composite image imaging data. It should be noted that it is also possible for the camera 15 of any one of the second projector 1B through the fourth projector 1D to take the first composite image E1 displayed on the display surface 3 to thereby generate the first composite image imaging data. It is also possible for the camera 15 of any one of the first projector 1A, the third projector 1C, and the fourth projector 1D to take the second composite image E2 displayed on the display surface 3 to thereby generate the second composite image imaging data.

The camera 15 of the first projector 1A takes the first projection image F1 displayed on the display surface 3 to thereby generate first projection image imaging data. The camera 15 of the second projector 1B takes the second projection image F2 displayed on the display surface 3 to thereby generate second projection image imaging data. The camera 15 of the third projector 1C takes the third projection image F3 displayed on the display surface 3 to thereby generate third projection image imaging data. The camera 15 of the fourth projector 1D takes the fourth projection image F4 displayed on the display surface 3 to thereby generate fourth projection image imaging data.

The camera 15 can be disposed as a separate member from the projector 1. In this case, the camera 15 and the projector 1 are coupled to each other with a wired or wireless interface so as to be able to perform transmission/reception of data.

The first storage section 16 is a recording medium which can be read by the first processing section 17. The first storage section 16 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a PAM.

The first storage section 16 stores a control program to be executed by the first processing section 17, and a variety of types of data to be used by the first processing section 17.

The first processing section 17 is formed of, for example, a single processor, or a plurality of processors. Citing an example, the first processing section 17 is formed of a signal CPU (Central Processing Unit) or a plurality of CPUs. Some or all of the functions of the first processing section 17 can also be realized by a circuit such as a DSP (Digital Signal Processor) an ASIC (Application Specific Integrated Circuit), a PLD (Programmable Logic Device), or an FPGA (Field Programmable Gate Array). The first processing section 17 executes a plurality of types of processing in parallel or in sequence. The first processing section 17 retrieves the control program from the first storage section 16. The first processing section 17 executes the control program to thereby realize an operation control section 171 and an image quality correction section 173.

The operation control section 171 controls a variety of operations of the projector 1. For example, the operation control section 171 controls the first communication section 13, the projection section 14, and the camera 15.

Citing an example, the operation control section 171 controls the image processing section 141, the light valve drive section 143, and the light source 144 to thereby make the projection section 14 project the image. The operation control section 171 makes the camera 15 take the image. The operation control section 171 makes the first communication section 13 transmit the imaging data to the control device 2.

The image quality correction section 173 corrects the image quality of the image projected from the projection section 14. The image quality correction section 173 controls the image processing section 141 using, for example, a variety of types of correction data to thereby correct the brightness of the image and the color of the image.

In the initial state, the image quality correction section 173 makes the image processing section 141 correct the image signal based on initial brightness correction data set in advance to thereby correct the brightness of the projection image from the brightness represented by the image signal having not yet been corrected into the brightness represented by the image signal having been corrected.

The initial brightness correction data is set before the shipment of the projector 1 in order to reduce the shift from a reference in the brightness of the image based on, for example, the individual difference of the projector 1.

Further, when there exist brightness correction data described later and provided from the control device 2, and the initial brightness correction data, the image quality correction section 173 makes the image processing section 141 correct the image signal based on the initial brightness correction data and the brightness correction data provided form the control device 2 to thereby correct the brightness of the projection image from the brightness represented by the image signal having not yet been corrected into the brightness represented by the image signal having been corrected.

When there exist the brightness correction data described later and provided from the control device 2, the initial brightness correction data, and user-set brightness correction data set by the user, the image quality correction section 173 makes the image processing section 141 correct the image signal based on the initial brightness correction data, the user-set brightness correction data, and the brightness correction data provided from the control device 2. Therefore, the brightness of the projection image changes from the brightness represented by the image signal having not yet been corrected to the brightness represented by the image signal having been corrected.

The user-set brightness correction data is set by the user when the user adjusts the brightness of the image.

Further, in the initial state, the image quality correction section 173 makes the image processing section 141 correct the image signal based on initial color correction data set in advance to thereby correct the colors of the projection image from the colors represented by the image signal having not yet been corrected into the colors represented by the image signal having been corrected. The initial color correction data is an example of initial correction data. The image signal having been corrected is an example of a first corrected image signal.

The initial color correction data is set before the shipment of the projector 1 in order to reduce the shift from a reference in the colors of the image based on, for example, the individual difference of the projector 1.

Further, when there exists color correction data described later and provided from the control device 2, the image quality correction section 173 makes the image processing section 141 correct the image signal based on the initial color correction data and the color correction data provided from the control device 2 to thereby correct the colors of the projection image from the colors represented by the image signal having not yet been corrected into the colors represented by the image signal having been corrected.

When there exist the color correction data described later and provided from the control device 2, the initial color correction data, and user-set color correction data set by the user, the image quality correction section 173 makes the image processing section 141 correct the image signal based on the initial color correction data, the user-set color correction data, and the color correction data provided from the control device 2. Therefore, the colors of the projection image change from the colors represented by the image signal having not yet been corrected to the colors represented by the image signal having been corrected.

The user-set color correction data is set by the user when the user adjusts the colors of the image.

A3: One Example of Control Device 2

Figures 5, 6:
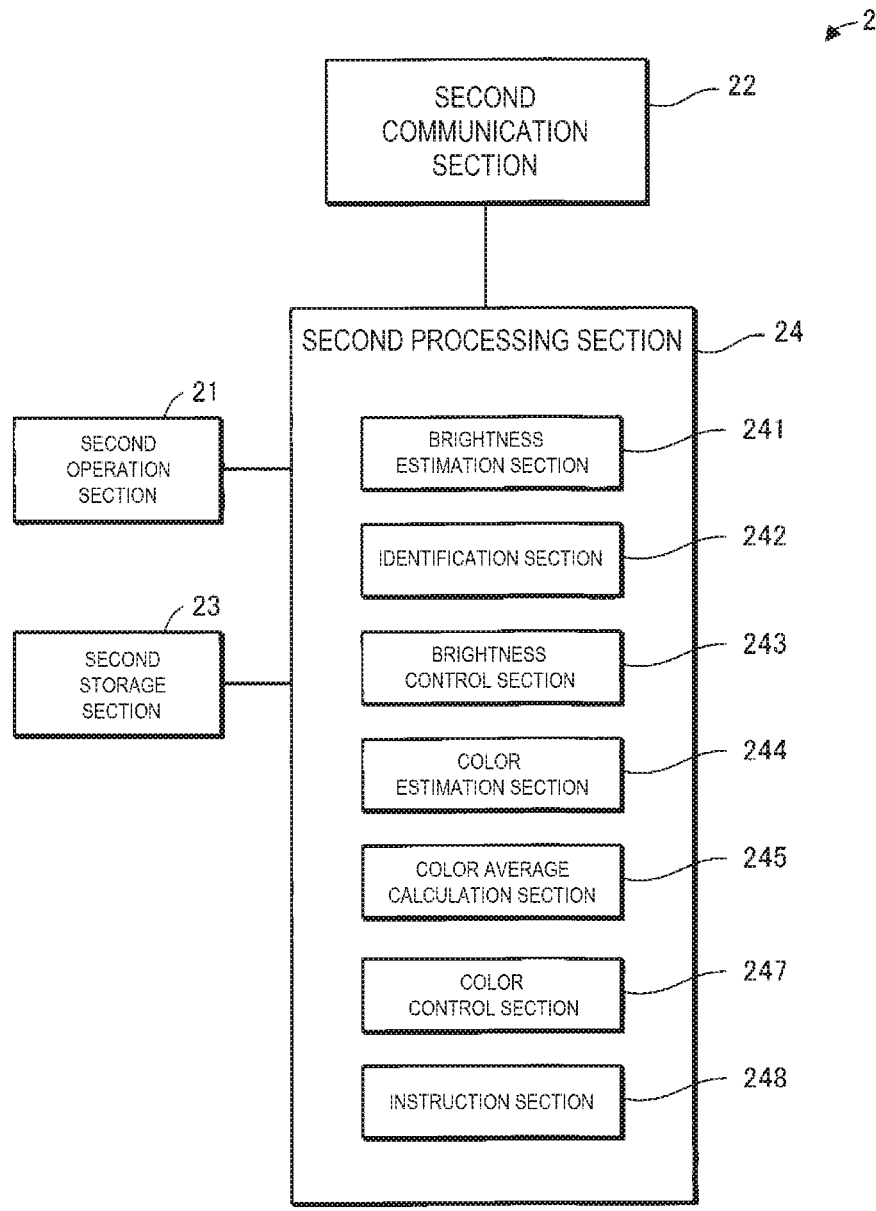
FIG. 5 is a diagram showing an example of a control device.
FIG. 6 is a diagram showing an example of a first image.

FIG. 5 is a diagram showing an example of the control device 2. The control device 2 includes a second operation section 21, a second communication section 22, a second storage section 23, and a second processing section 24.

The second operation section 21 corresponds to, for example, a keyboard, operating buttons, or a touch panel. The second operation section 21 receives an input operation by the user.

The second communication section 22 communicates with each of the first projector 1A through the fourth projector 1D. Specifically, the second communication section 22 communicates with the first communication section 13 via the wired LAN. The communication format between the second communication section 22 and the first communication section 13 is not limited to the wired LAN. The second communication section 22 receives the first composite image imaging data, the second composite image imaging data, the first projection image imaging data, the second projection image imaging data, the third projection image imaging data, and the fourth projection image imaging data.

The second storage section 23 is a recording medium which can be read by the second processing section 24. The second storage section 23 includes, for example, a nonvolatile memory and a volatile memory. The second storage section 23 stores a control program to be executed by the second processing section 24, and a variety of types of data to be used by the second processing section 24.

The second processing section 24 is formed of, for example, a single processor, or a plurality of processors. Citing an example, the second processing section 24 is formed of a signal CPU or a plurality of CPUs. Some or all of the functions of the second processing section 24 can be realized by a circuit such as a DSP, an ASIC, a PLD, or an FPGA. The second processing section 24 executes a plurality of types of processing in parallel or in sequence. The second processing section 24 retrieves the control program from the second storage section 23. The second processing section 24 executes the control program retrieved from the second storage section 23 to thereby realize a brightness estimation section 241, an identification section 242, a brightness control section 243, a color estimation section 244, a color average calculation section 245, a color control section 247, and an instruction section 248.

The brightness estimation section 241 estimates the brightness of the first composite image E1 to be displayed in the first area 31 in a first situation in which the first projector 1A and the second projector 1B project a white image based on a white image signal representing white. The white image signal is an example of a first image signal. It should be noted that in the first situation, the third projector 1C and the fourth projector 1D project a black image based on a black image signal representing black. Hereinafter, the first composite image E1 displayed in the first area 31 in the first situation is referred to as a "first situation image E11." The first situation image E11 is an example of a first image. The brightness estimation section 241 estimates the brightness of the first situation image E11 using the first composite image imaging data representing the first situation image E11.

The brightness estimation section 241 estimates the brightness of the second composite image E2 to be displayed in the second area 32 in a second situation in which the third projector 1C and the fourth projector 1D project a white image based on the white image signal. In the second situation, the first projector 1A and the second projector 1B project a black image based on the black image signal. Hereinafter, the second composite image E2 displayed in the second area 32 in the second situation is referred to as a "second situation image E22." The second situation image E22 is an example of the first image. The brightness estimation section 241 estimates the brightness of the second situation image E22 using the second composite image imaging data representing the second situation image E22.

FIG. 6 shows an example of the first image. Further, FIG. 7 shows an example of the first situation and the second situation.

It should be noted that the first projector 1A through the fourth projector 1D each correct the white image signal based on at least the initial color correction data and the initial brightness correction data to thereby generate the white image signal having been corrected. Further, the first projector 1A through the fourth projector 1D each project the image represented by the white image signal having been corrected.

Therefore, when the first projector 1A through the fourth projector 1D are different in initial brightness correction data from each other, the first situation image E11 and the second situation image E22 are different in brightness from each other.

Further, even when the first projector 1A through the fourth projector 1D are not different in initial brightness correction data from each other, there is a possibility that the first situation image E11 and the second situation image E22 are different in brightness from each other based on the individual difference between the first projector 1A through the fourth projector 1D.

The identification section 242 identifies a dark image as the darkest image of the first situation image E11 and the second situation image E22, and a first adjustment target image different from the dark image out of the first situation image E11 and the second situation image E22 based on a result of the estimation by the brightness estimation section 241. FIG. 8 shows an example of the dark image and the adjustment target image.

When the first situation image E11 is the first adjustment target image, the brightness control section 243 controls at least one of the first projector 1A and the second projector 1B to thereby approximate the brightness of the first adjustment target image to the brightness of the dark image, when the second situation image E22 is the first adjustment target image, the brightness control section 243 controls at least one of the third projector 1C and the fourth projector 1D to thereby approximate the brightness of the first adjustment target image to the brightness of the dark image.

The color estimation section 244 estimates the value of the color of the first projection image F1 to be displayed in the first area 31 in the third situation in which the first projector 1A projects the first projection image F1 based on a red image signal representing solid red.

The value of the color is expressed by a combination of a value of the red component, a value of the green component, and a value of the blue component. The value of the color is not limited to the combination of the value of the red component, the value of the green component, and the value of the blue component. For example, it is possible for the value of the color to be represented by XYZ values defined in the XYZ color system.

In the third situation, the second projector 1B, the third projector 1C, and the fourth projector 1D each project a black image based on the black image signal. Hereinafter, the first projection image F1 displayed in the first area 31 in the third situation is referred to as a "first red image F11." The red image signal is an example of a second image signal. The second image signal is not limited to the red image signal. For example, the second image signal can be the green image signal representing solid green, or can also be the blue image signal representing solid blue. The first red image F11 is an example of the second image. The color estimation section 244 estimates the value of the color of the first red image F11 using the first projection image imaging data representing the first red image F11.

The color estimation section 244 estimates the value of the color of the second projection image F2 to be displayed in the first area 31 in the fourth situation in which the second projector 1B projects the second projection image F2 based on the red image signal. In the fourth situation, the first projector 1A, the third projector 1C, and the fourth projector 1D each project a black image based on the black image signal. Hereinafter, the second projection image F2 displayed in the first area 31 in the fourth situation is referred to as a "second red image F22." The second red image F22 is an example of the second image. The color estimation section 244 estimates the value of the color of the second red image F22 using the second projection image imaging data representing the second red image F22.

The color estimation section 244 estimates the value of the color of the third projection image F3 to be displayed in the second area 32 in a fifth situation in which the third projector 1C projects the third projection image F3 based on the red image signal. In the fifth situation the first projector 1A, the second projector 1B, and the fourth projector 1D each project a black image based on the black image signal. Hereinafter, the third projection image F3 displayed in the second area 32 in the fifth situation is referred to as a "third red image F33." The third red image F33 is an example of the second image. The color estimation section 244 estimates the value of the color of the third red image F33 using the third projection image imaging data representing the third red image F33.

The color estimation section 244 estimates the value of the color of the fourth projection image F4 to be displayed in the second area 32 in a sixth situation in which the fourth projector 1D projects the fourth projection image F4 based on the red image signal. In the sixth situation, the first projector 1A, the second projector 1B, and the third projector 1C each project a black image based on the black image signal. Hereinafter, the fourth projection image F4 displayed in the second area 32 in the sixth situation is referred to as a "fourth red image F44." The fourth red image F44 is an example of the second image. The first red image F11 through the fourth red image F44 are an example of the plurality of second images. The color estimation section 244 estimates the value of the color of the fourth red image F44 using the fourth projection image imaging data representing the fourth red image F44.

FIG. 9 shows an example of the second image. Further, FIG. 10 shows an example of the third situation, the fourth situation, the fifth situation, and the sixth situation.

It should be noted that the first projector 1A through the fourth projector 1D each correct the red image signal based on at least the initial color correction data and the initial brightness correction data to thereby generate the red image signal having been corrected. Further, the first projector 1A through the fourth projector 1D each project the image represented by the red image signal having been corrected.

Therefore, when the first projector 1A through the fourth projector 1D are different in initial color correction data from each other, the first red image F11 through the fourth red image F44 are different in value of the color from each other.

Further, even when the first projector 1A through the fourth projector 1D are not different in initial color correction data from each other, there is a possibility that the first red image F11 through the fourth red image F44 are different in value of the color from each other based on the individual difference between the first projector 1A through the fourth projector 1D.

The color average calculation section 245 obtains an average of the value of the color of the first red image F11, the value of the color of the second red image F22, the value of the color of the third red image F33, and the value of the color of the fourth red image F44 based on a result of the estimation by the color estimation section 244. Hereinafter, the average of the value of the color of the first red image F11, the value of the color of the second red image F22, the value of the color of the third red image F33, and the value of the color of the fourth red image F44 is referred to as a "first average value."

The color control section 247 identifies a second adjustment target image showing a value of a color different from the first average value out of the first red image F11 through the fourth red image F44.

The color control section 247 controls the projector for projecting the second adjustment target image out of the first projector 1A through the fourth projector 1D to thereby approximate the value of the color of the second adjustment target image to the first average value.

The instruction section 248 transmits an instruction to each of the first projector 1A through the fourth projector 1D. Citing an example, the instruction section 248 transmits an instruction of executing a calibration operation of associating an imaging coordinate in the imaging data generated by the camera 15 and a panel coordinate in the liquid crystal light valves 145 with each other to each of the first projector 1A through the fourth projector 1D.

A4: Outline of Brightness Control

Figure 11:
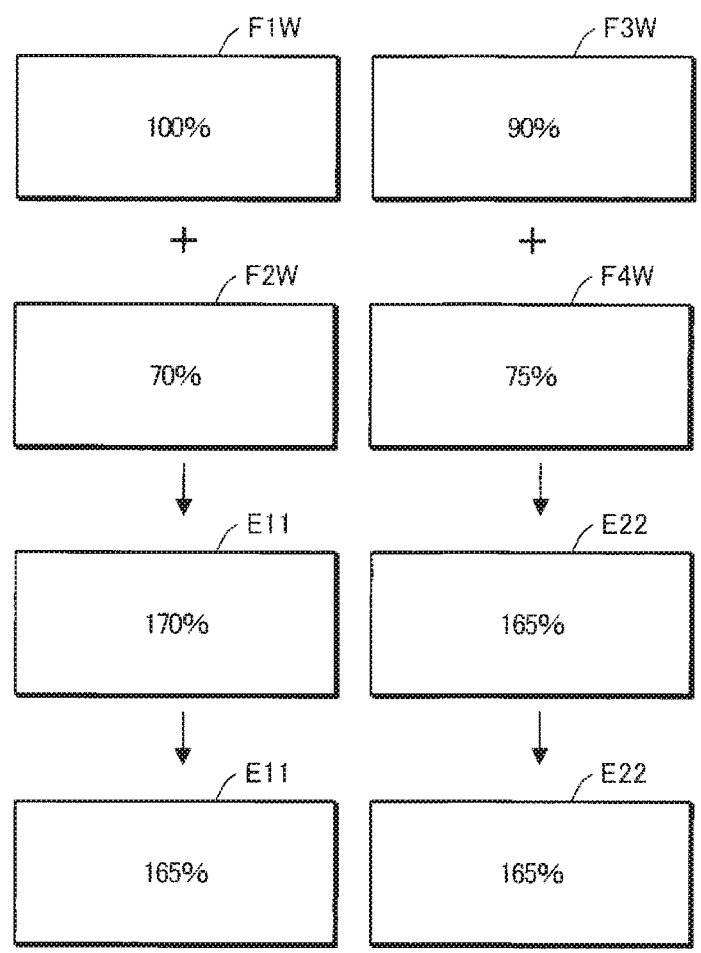
FIG. 11 is a diagram for explaining an outline of the brightness control.

FIG. 11 is a diagram for describing an outline of the brightness control. In FIG. 11, the brightness of the first white image F1W to be projected by the first projector 1A as the first projection image F1 based on the white image signal is defined as 100%. The brightness of the first white image F1W in this case is an example of a first brightness. The brightness of the second white image F2W to be projected by the second projector 1B as the second projection image F2 based on the white image signal is assumed to be 70% of the brightness of the first white image F1W. The brightness of the second white image F2W in this case is an example of a second brightness. The brightness of the third white image F3W to be projected by the third projector 1C as the third projection image F3 based on the white image signal is assumed to be 90% of the brightness of the first white image F1W. The brightness of the third white image F3W in this case is an example of a third brightness. The brightness of the fourth white image F4W to be projected by the fourth projector 1D as the fourth projection image F4 based on the white image signal is assumed to be 75% of the brightness of the first white image F1W. The brightness of the fourth white image F4W in this case is an example of a fourth brightness.

In this case, the brightness of the first situation image E11 becomes 170% of the brightness of the first white image F1W, and the brightness of the second situation image E22 becomes 165% of the brightness of the first white image F1W. Therefore, the identification section 242 identifies the second situation image E22 as the dark image. Further, the identification section 242 identifies the first situation image E11 as the first adjustment target image. The brightness control section 243 controls, for example, the first projector 1A to thereby reduce the brightness of the first white image F1W from 100% to 95%. Therefore, the brightness of the first situation image E11 approximates to the brightness of the second situation image E22. Then, the brightness of the first situation image E11 coincides with the brightness of the second situation image E22. It should be noted that the relationship of the brightness between the first white image F1W through the fourth white image F4W is not limited to the relationship described above. For example, the fourth white image F4W can be the brightest of the first white image F1W through the fourth white image F4K.

The first composite image E1 as the first situation image E11 is obtained by performing the stack projection of the first projection image F1 and the second projection image F2, and is therefore projected with the fifth brightness brighter than the first brightness and the second brightness. Further, the second composite image E2 as the second situation image E22 is obtained by performing the stack projection of the third projection image F3 and the fourth projection image F4, and is therefore displayed with the sixth brightness brighter than the third brightness and the fourth brightness. Further, when the sixth brightness is darker than the fifth brightness, the first composite image E1 is projected with the sixth brightness, and when the fifth brightness is darker than the sixth brightness, the second composite image E2 is projected with the fifth brightness. Therefore, the first composite image E1 as a result of the stack projection and the second composite image E2 as a result of the stack projection can be projected as the tiling projection with the unevenness in brightness suppressed so as to be brighter than the first brightness, the second brightness, the third brightness, and the fourth brightness.

It should be noted that the brightness control can use not only the white image but also an image including at least a G component as a green component. For example, it is also possible to use a G image as a solid color image, or a solid color image using an R+G+B image. Further, the color adjustment can be performed for white, or each of the solid colors of R, G, and B.

A5: Calibration Operation

Figure 12:
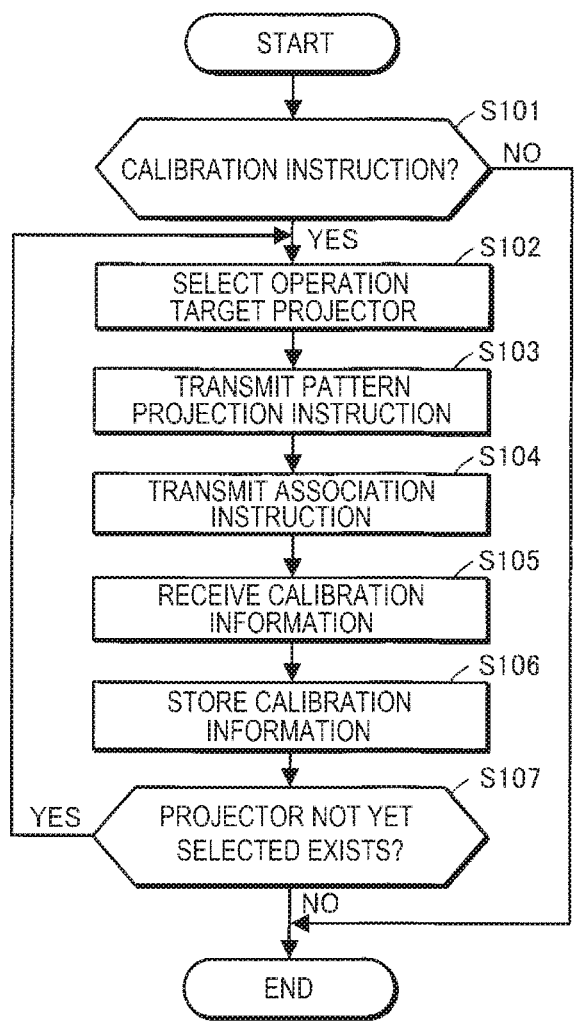
FIG. 12 is a flowchart for explaining a calibration operation.

FIG. 12 is a flowchart for explaining the calibration operation of associating the imaging coordinate and the panel coordinate with each other. Hereinafter, it is assumed that the first projector 1A through the fourth projector 1D are each projecting the black image based on the black image signal.

When the second operation section 21 receives in the step S101 a calibration instruction of executing the calibration operation, the instruction section 248 selects in the step S102 one operation target projector from the projectors not yet selected as the operation target projector out of the first projector 1A through the fourth projector 1D.

Subsequently, in the step S103, the instruction section 248 transmits a pattern projection instruction from the second communication section 22 to the operation target projector.

In the operation target projector, when the first communication section 13 receives the pattern projection instruction, the operation control section 171 makes the projection section 14 project a pattern image to the display surface 3. The pattern image is, for example, a grid pattern. On the four corners of the pattern image, there are formed predetermined marks. The predetermined marks are used when detecting the four corners of the pattern image. When the first storage section 16 stores pattern image data representing the pattern image, the operation control section 171 retrieves the pattern image data from the first storage section 16. The operation control section 171 outputs the image signal representing the pattern image data to the image processing section 141 to thereby make the projection section 14 project the pattern image toward the display surface 3.

After transmitting the pattern projection instruction, the instruction section 248 transmits in the step S104 an association instruction from the second communication section 22 to the operation target projector.

In the operation target projector, when the first communication section 13 receives the association instruction, the operation control section 171 makes the camera 15 perform imaging. The camera 15 performs imaging to thereby generate the imaging data. The operation control section 171 associates the imaging coordinate in the imaging data and the panel coordinate in the liquid crystal light valves 145 with each other. Specifically, the operation control section 171 firstly detects a mark in the pattern image represented by the imaging data. Subsequently, the operation control section 171 identifies the position of the pixel representing the mark in the pattern image in the imaging data. Subsequently, the operation control section 171 identifies the position of the pixel representing the mark in the pattern image in the liquid crystal light valves 145. Subsequently, the operation control section 171 generates calibration information in which the position of the pixel representing the mark in the pattern image in the imaging data and the position of the pixel representing the mark in the pattern image in the liquid crystal light valves 145 are associated with each other. Therefore, the imaging coordinate and the panel coordinate are associated with each other. The calibration information can also be referred to as coordinate conversion information.

The position of the pixel representing the mark in the liquid crystal light valves 145 can be stored in, for example, the first storage section 16 in advance. In this case, it is also possible for the operation control section 171 to obtain the position of the pixel representing the mark in the liquid crystal light valves 145 from the first storage section 16. Further it is also possible for the operation control section 171 to identify the position of the pixel representing the mark in the liquid crystal light valves 145 based on the position of the pixel representing the mark in the frame memory 142 when the image processing section 141 develops the pattern image in the frame memory 142. In this case the first storage section 16 stores in advance, position association information for associating the position of the pixel in the frame memory 142 and the position of the pixel in the liquid crystal light valves 145 with each other. The operation control section 171 uses the position association information to thereby identify the position of the pixel representing the mark in the liquid crystal light valves 145 based on the position of the pixel representing the mark in the frame memory 142. Subsequently, the operation control section 171 transmits the calibration information from the first communication section 13 to the control device 2.

When the second communication section 22 receives in the step S105 the calibration information from the operation target projection, the instruction section 248 stores in the step S106 the calibration information in the second storage section 23.

Subsequently, in the step S107, the instruction section 248 determines whether or not there exists a projector not yet selected as the operation target projector in the first projector 1A through the fourth projector 1D.

When there exists a projector not yet selected in the step S107, the process returns to the step S102. In the step S102, for example, the instruction section 248 selects the operation target projector in the order of the first projector 1A, the second projector 1B, the third projector 1C, and the fourth projector 1D. The order in the selection of the operation target projector is not limited to the order of the first projector 1A, the second projector 1B, the third projector 1C, and the fourth projector 1D, and can arbitrarily be changed.

When there exists no projector not yet selected in the step S107, the operation shown in FIG. 12 is terminated.

A6: Brightness Adjustment Operation

Figure 13:
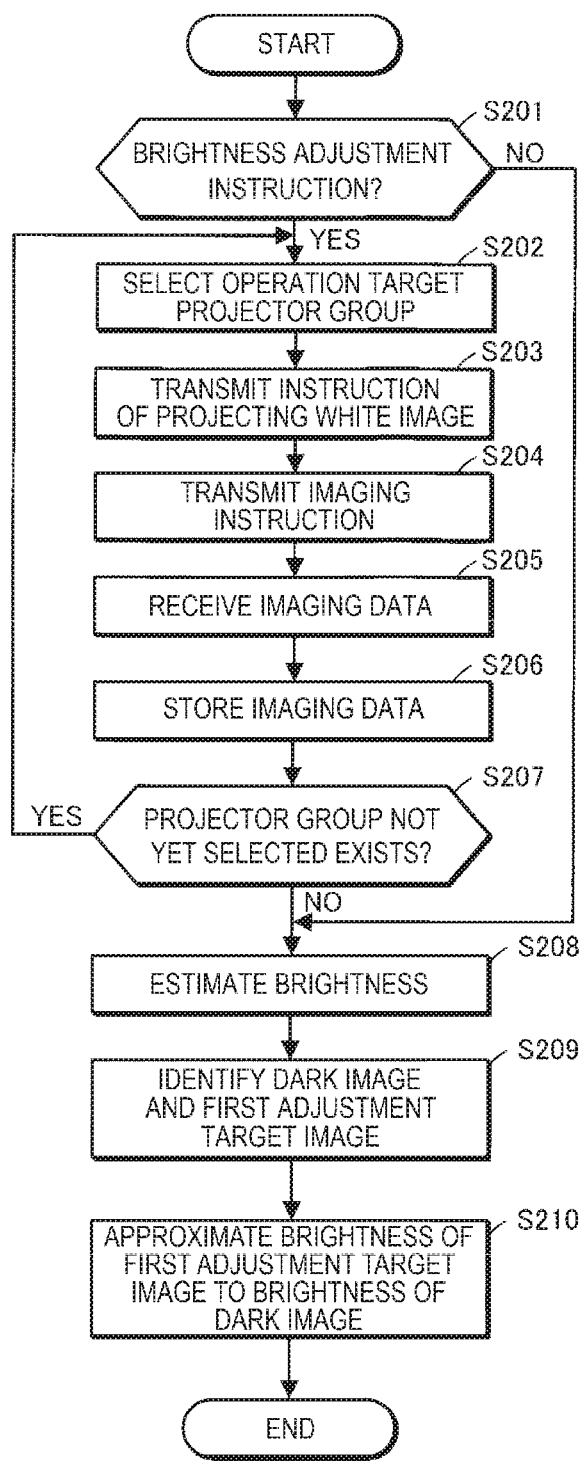
FIG. 13 is a flowchart for explaining a brightness adjustment operation.

FIG. 13 is a flowchart for explaining a brightness adjustment operation. Hereinafter, it is assumed that the first projector 1A through the fourth projector 1D are each projecting the black image based on the black image signal.

When the second operation section 21 receives in the step S201 a brightness adjustment instruction of executing the brightness adjustment operation, the brightness estimation section 241 selects in the step S202 one operation target projector group from the projector groups not yet selected as the operation target projector group out of the first projector group 101 through the second projector group 102.

Subsequently, in the step S203, the brightness estimation section 241 transmits an instruction of projecting the white image from the second communication section 22 to each of the projectors belonging to the operation target projector group.

In the projector belonging to the operation target projector group, when the first communication section 13 receives the instruction of projecting the white image, the operation control section 171 makes the projection section 14 project the white image to the display surface 3. The white image is a solid white image. The gray level of the white image represents the highest gray level of the settable gray levels. It should be noted that the gray level of the white image can be a different gray level from the highest gray level of the settable gray levels. When the first storage section 16 stores white image data representing the white image, the operation control section 171 retrieves the white image data from the first storage section 16. Subsequently, the operation control section 171 outputs the white image signal representing the white image data to the image processing section 141 to thereby make the projection section 14 project the white image toward the display surface 3. Therefore, for example, when the first projector group 101 is selected as the operation target projector group, the first situation image E11 is displayed in the first area 31. Further, when the second projector group 102 is selected as the operation target projector group, the second situation image E22 is displayed in the second area 32.

After the transmission of the instruction of projecting the white image, in the step S204, the brightness estimation section 241 transmits an imaging instruction from the second communication section 22 to a projector set in advance as a white image taking projector with respect to the operation target projector group. Here, the first projector 1A is set in advance as the white image taking projector with respect to the first projector group 101. It should be noted that the white image taking projector with respect to the first projector group 101 is not limited to the first projector 1A. The white image taking projector with respect to the first projector group 101 can also be, for example, the second projector 1B. The third projector 1C is set in advance as the white image taking projector with respect to the second projector group 102. It should be noted that the white image taking projector with respect to the second projector group 102 is not limited to the third projector 1C. The white image taking projector with respect to the second projector group 102 can also be, for example, the fourth projector 1D.

In the white image taking projector, when the first communication section 13 receives the imaging instruction, the operation control section 171 makes the camera 15 perform imaging when the white image taking projector with respect to the first projector group 101 is the first projector 1A, the camera 15 in the first projector 1A takes the first situation image E11 displayed on the display surface 3 to thereby generate the first composite image imaging data. When the white image taking projector with respect to the second projector group 102 is the third projector 1C, the camera 15 in the third projector 1C takes the second situation image E22 displayed on the display surface 3 to thereby generate the second composite image imaging data.

Subsequently, the operation control section 171 transmits the imaging data generated by the camera 15, specifically the first composite image imaging data or the second composite image imaging data, from the first communication section 13 to the control device 2.

When the second communication section 22 receives the first composite image imaging data or the second composite image imaging data in the step S205, the brightness estimation section 241 stores in the step S206 the imaging data received by the second communication section 22 in the second storage section 23. Subsequently, the brightness estimation section 241 transmits an instruction of projecting the black image from the second communication section 22 to each of the projectors belonging to the operation target projector group. Each of the projectors belonging to the operation target projector group projects the black image in accordance with the instruction of projecting the black image.

Subsequently, in the step S207, the brightness estimation section 241 determines whether or not there exists a projector group not yet selected as the operation target projector group in the first projector group 101 through the second projector group 102.

When there exists a projector group not yet selected in the step S207, the process returns to the step S202. In the step S202, for example, the brightness estimation section 241 selects the operation target projector groups in the order of the first projector group 101 and the second projector group 102. The order in selecting the operation target projector group is not limited to the order of the first projector group 101 and the second projector group 102, and can arbitrarily be changed.

When there exists no projector group not yet selected in the step S207, the brightness estimation section 241 estimates the brightness of the first situation image E11 based on the first composite image imaging data and estimates the brightness of the second situation image E22 based on the second composite image imaging data in the step S208.

For example, the brightness estimation section 241 firstly identifies the pixel area representing the first situation image E11 from the first composite image imaging data using the calibration information of the first projector 1A. Subsequently, the brightness estimation section 241 estimates the average in luminance shown by the pixels in the pixel area representing the first situation image E11 as the brightness of the first situation image E11. It should be noted that it is also possible for the brightness estimation section 241 to estimate the luminance shown by the pixel located at a specific position in the pixel area representing the first situation image E11, for example, the center of the pixel area, as the brightness of the first situation image E11. In this case, the process of calculating the average in luminance can be made unnecessary. The specific position in the pixel area representing the first situation image E11 is not limited to the central position of the pixel area representing the first situation image E11, and can also be a position different from the central position of the pixel area representing the first situation image E11. The brightness estimation section 241 estimates the brightness of the second situation image E22 using substantially the same method as the method used when estimating the brightness of the first situation image E11.

Subsequently, in the step S209, the identification section 242 identifies the dark image as the darkest image of the first situation image E11 and the second situation image E22, and the first adjustment target image different from the dark image out of the first situation image E11 and the second situation image E22 based on the result of the estimation by the brightness estimation section 241. When the brightness of the first situation image E11 is equal to the brightness of the second situation image E22, the identification section 242 identifies one of the first situation image E11 and the second situation image E22, for example, the first situation image E11 as the dark image, and identifies the other of the first situation image E11 and the second situation image E22, for example, the second situation image E22 as the first adjustment target image. It should be noted that when the brightness of the first situation image E11 is equal to the brightness of the second situation image E22, the step S209 and the step S210 described later can be eliminated.

Subsequently, after the completion of the step S209, in the step S210, when the first situation image E11 is the first adjustment target image, the brightness control section 243 controls only the first projector 1A to thereby approximate the brightness of the first adjustment target image to the brightness of the dark image. For example, the brightness control section 243 generates brightness correction data representing a difference between the brightness of the first adjustment target image and the brightness of the dark image. Subsequently, the brightness control section 243 transmits the instruction of projecting the white image from the second communication section 22 to each of the first projector 1A through the fourth projector 1D. Subsequently, the brightness control section 243 transmits the brightness correction data from the second communication section 22 only to the first projector 1A to thereby make the brightness of the first white image F1W projected by the first projector 1A darker as much as the brightness represented by the brightness correction data. Here, in the first projector 1A, when receiving the brightness correction data, the brightness of the first white image F1W is made darker as much as the brightness represented by the brightness correction data.

It should be noted that when the first situation image E11 is the first adjustment target image, it is possible for the brightness control section 243 to control both of the first projector 1A and the second projector 1B to thereby approximate the brightness of the first adjustment target image to the brightness of the dark image. For example, the brightness control section 243 generates the brightness correction data representing a value a half as much as a difference between the brightness of the first adjustment target image and the brightness of the dark image. Subsequently, the brightness control section 243 transmits the instruction of projecting the white image from the second communication section 22 to each of the first projector 1A through the fourth projector 1D. Subsequently, the brightness control section 243 transmits the brightness correction data from the second communication section 22 to both of the first projector 1A and the second projector 1B to thereby make the brightness of the first white image F1W projected by the first projector 1A darker as much as the brightness represented by the brightness correction data, and at the same time, make the brightness of the second white image F2W projected by the second projector 1B darker as much as the brightness represented by the brightness correction data.

When the second situation image E22 is the first adjustment target image, the brightness control section 243 controls only the third projector 1C to thereby approximate the brightness of the first adjustment target image to the brightness of the dark image. For example, the brightness control section 243 generates brightness correction data representing a difference between the brightness of the first adjustment target image and the brightness of the dark image. Subsequently, the brightness control section 243 transmits the instruction of projecting the white image from the second communication section 22 to each of the first projector 1A through the fourth projector 1D. Subsequently, the brightness control section 243 transmits the brightness correction data from the second communication section 22 only to the third projector 1C to thereby make the brightness of the third white image F3W projected by the third projector 1C darker as much as the brightness represented by the brightness correction data.

It should be noted that when the second situation image E22 is the first adjustment target image, it is possible for the brightness control section 243 to control both of the third projector 1C and the fourth projector 1D to thereby approximate the brightness of the first adjustment target image to the brightness of the dark image. For example, the brightness control section 243 generates the brightness correction data representing a value a half as much as a difference between the brightness of the first adjustment target image and the brightness of the dark image. Subsequently, the brightness control section 243 transmits the instruction of projecting the white image from the second communication section 22 to each of the first projector 1A through the fourth projector 1D. Subsequently, the brightness control section 243 transmits the correction data from the second communication section 22 to both of the third projector 1C and the fourth projector 1D to thereby make the brightness of the third white image F3W projected by the third projector 1C darker as much as the brightness represented by the brightness correction data, and at the same time, make the brightness of the fourth white image F4W projected by the fourth projector 1D darker as much as the brightness represented by the brightness correction data.

A7: Color Adjustment Operation

Figure 14:
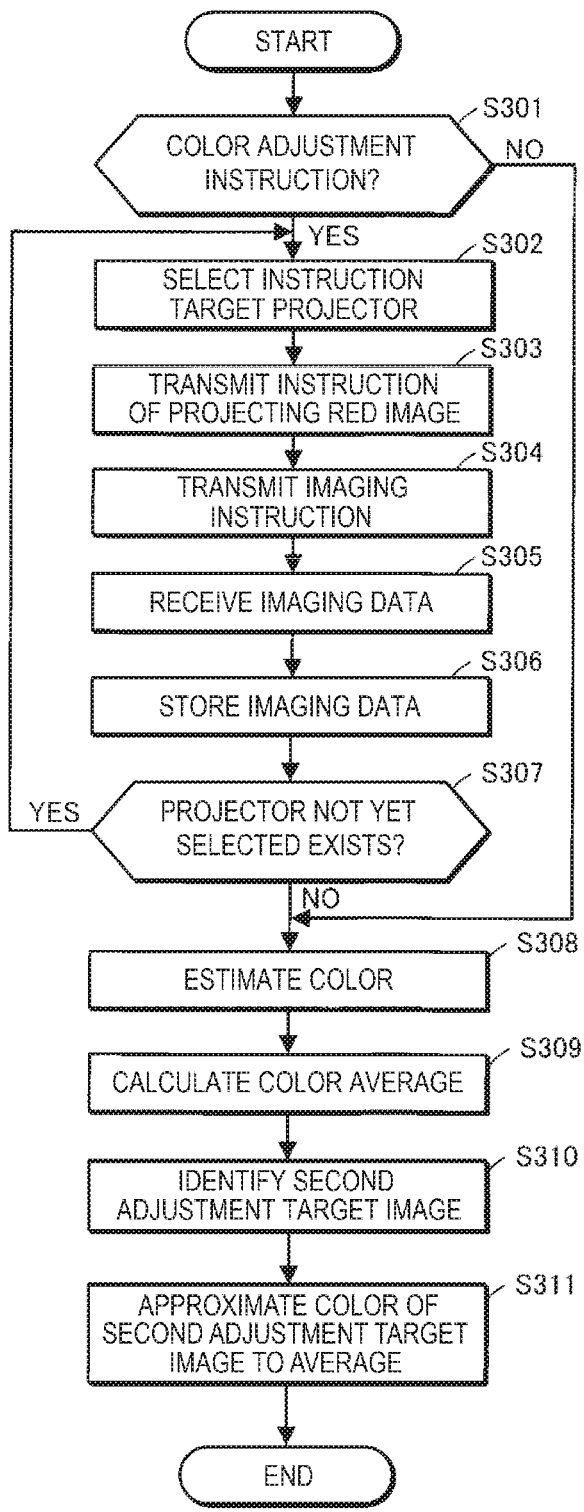
FIG. 14 is a flowchart for explaining a color adjustment operation.

FIG. 14 is a flowchart for explaining a color adjustment operation. Hereinafter, it is assumed that the first projector 1A through the fourth projector 1D are each projecting a black image based on the black image signal.

When the second operation section 21 receives in the step S301 a color adjustment instruction of executing the color adjustment, the color estimation section 244 selects in the step S302 one instruction target projector from the projectors not yet selected as the instruction target projector out of the first projector 1A through the fourth projector 1D.

Subsequently, in the step S303, the color estimation section 244 transmits an instruction of projecting the red image from the second communication section 22 to the instruction target projector.

In the instruction target projector, when the first communication section 13 receives the instruction of projecting the red image, the operation control section 171 makes the projection section 14 project the red image to the display surface 3. The gray level of the red image is set to an intermediate gray level in the settable gray levels. It should be noted that the gray level of the red image can be different from the intermediate gray level. When the first storage section 16 stores red image data representing the red image, the operation control section 171 retrieves the red image data from the first storage section 16. Subsequently, the operation control section 171 outputs the red image signal representing the red image data to the image processing section 141 to thereby make the projection section 14 project the red image to the display surface 3.

After the transmission of the instruction of projecting the red image, in the step S304, the color estimation section 244 transmits the imaging instruction from the second communication section 22 to the instruction target projector.

In the instruction target projector, when the first communication section 13 receives the imaging instruction, the operation control section 171 makes the camera 15 perform imaging.

Subsequently, the operation control section 171 transmits the imaging data generated by the camera 15 from the first communication section 13 to the control device 2.

When the second communication section 22 receives the imaging data in the step S305, the color estimation section 244 stores in the step S306 the imaging data thus received in the second storage section 23. Subsequently, the color estimation section 244 transmits the instruction of projecting the black image from the second communication section 22 to the instruction target projector. The instruction target projector projects the black image in accordance with the instruction of projecting the black image.

Subsequently, in the step S307, the color estimation section 244 determines whether or not there exists a projector not yet selected as the instruction target projector in the first projector 1A through the fourth projector 1D.

When there exists a projector not yet selected in the step S307, the process returns to the step S302. In the step S302, for example, the color estimation section 244 selects the instruction target projector in the order of the first projector 1A, the second projector 1B, the third projector 1C, and the fourth projector 1D. The order in the selection of the instruction target projector is not limited to the order of the first projector 1A, the second projector 1B, the third projector 1C, and the fourth projector 1D, and can arbitrarily be changed.

When there exists no projector not yet selected in the step S307, the color estimation section 244 estimates in the step S308 the value of the color of each of the first red image F11 through the fourth red image F44 based on the imaging data stored in the second storage section 23 in the step S306.

For example, the color estimation section 244 firstly identifies the pixel area representing the first red image F11 from the first projection image imaging data representing the first red image F11 using the calibration information of the first projector 1A. Subsequently, the color estimation section 244 estimates the value of the color represented by the pixel located at the center of the pixel area representing the first red image F11, for example, the value of the color represented by a combination of the respective pixel values of red, green, and blue in the pixel located at the center, as the value of the color of the first red image F11. The pixel located at the center of the pixel area representing the first red image F11 is an example of a predetermined area in the pixel area representing the first red image F11. The predetermined area in the pixel area representing the first red image F11 is not limited to the pixel located at the center of the pixel area representing the first red image F11. The color estimation section 244 performs the estimation with respect to the value of the color of each of the second red image F22 through the fourth red image F44 similarly to the value of the color of the first red image F11.

Subsequently, in the step S309, the color average calculation section 245 calculates a first average value as an average of the value of the color of the first red image F11, the value of the color of the second red image F22, the value of the color of the third red image F33, and the value of the color of the fourth red image F44 based on a result of the estimation of the value of the color by the color estimation section 244.

For example, the color average calculation sect ion 245 firstly calculates a red component average value as an average of the value of the red component of the first red image F11, the value of the red component of the second red image F22, the value of the red component of the third red image F33, and the value of the red component of the fourth red image F44. Subsequently, the color average calculation section 245 calculates a green component average value as an average of the value of the green component of the first red image F11, the value of the green component of the second red image F22, the value of the green component of the third red image F33, and the value of the green component of the fourth red image F44. Subsequently, the color average calculation section 245 calculates a blue component average value as an average of the value of the blue component of the first red image F11, the value of the blue component of the second red image F22, the value of the blue component of the third red image F33, and the value of the blue component of the fourth red image F44. Subsequently, the color average calculation section 245 determines the value of the color specified by a combination of the average values of the value of the red component, the value of the green component, and the value of the blue component as the first average value. The first average value is used as a target value of the color. Therefore, the color average calculation section 245 functions as a color target value calculation section. The order of the calculation of the red component average value, the green component average value, and the blue component average value can arbitrarily be changed.

Subsequently, in the step S310, the color control section 247 identifies an image showing a value of a color different from the first average value out of the first red image F11 through the fourth red image F44 as the second adjustment target image.

Subsequently, in the step S311, the color control section 247 controls the projector for projecting the second adjustment target image out of the first projector 1A through the fourth projector 1D to thereby approximate the value of the color of the second adjustment target image to the first average value.

For example, the color control section 247 generates a difference obtained by subtracting the first average value from the value of the color of the second adjustment target image, specifically a combination of the difference of the value of the red component, the difference of the value of the green component, and the difference of the value of the blue component, as the color correction data.

Subsequently, the color control section 247 transmits the instruction of projecting the red image from the second communication section 22 to each of the first projector 1A through the fourth projector 1D.

Subsequently, the color control section 247 transmits the color correction data from the second communication section 22 to the projector for projecting the second adjustment target image to thereby make the projector approximate the value of the color of the second adjustment target image to the first average value.

Here, in the projector for projecting the second adjustment target image, when receiving the color correction data, the value of the color of the image currently projected is changed to a value obtained by subtracting the difference represented by the correction data from the value of the color to thereby approximate the value of the color of the image currently projected to the first average value.

A8: Conclusion of First Embodiment

The control method and the control device 2 according to the disclosure described above include the following aspects.

The projection system 2000 includes the first projector 1A through the fourth projector 1D divided into the first projector group 101 and the second projector group 102. The first projector group 101 and the second projector group 102 are an example of the plurality of projector groups. The first projector 1A through the fourth projector 1D are an example of the plurality of projectors. The plurality of group-belonging projectors included in one projector group 101 out of the plurality of projector groups 101 through 102 projects images in the first area 31 as one display area corresponding to the projector group 101 out of the plurality of display areas constituted by the first area 31 and the second area 32 to thereby display the composite image E1 corresponding to the projector group 101 out of the plurality of composite images E1 through E2 corresponding one-to-one to the projector groups 101 through 102 in the first area 31. The brightness estimation section 241 makes the plurality of projectors 1A through 1D project the white image to estimate the brightness of each of the first situation image E11 and the second situation image E22 constituting the plurality of composite images. The identification section 242 identifies the dark image as the darkest image and the first adjustment target image different from the dark image out of the first situation image E11 and the second situation image E22 based on the result of the brightness estimation. The brightness control section 243 controls at least one of the projectors included in the projector group corresponding to the first adjustment target image out of the plurality of projector groups 101 through 102 to thereby approximate the brightness of the first adjustment target image to the brightness of the dark image.

For example, when the first situation image E11 is the first adjustment target image, the brightness control section 243 controls at least one of the first projector 1A and the second projector 1B to thereby approximate the brightness of the first adjustment target image to the brightness of the dark image. Further, when the second situation image E22 is the first adjustment target image, the brightness control section 243 controls at least one of the third projector 1C and the fourth projector 1D to thereby approximate the brightness of the first adjustment target image to the brightness of the dark image.

According to this aspect, it is possible to increase the brightness of the image displayed by each of the first projector 1A through the fourth projector 1D constituting the projection system 2000 compared to the configuration of making the brightness of the image projected by each of the first projector 1A through the fourth projector 1D coincide with the brightness of the darkest image of the images respectively projected by the first projector 1A through the fourth projector 1D.

It is possible for the brightness control section 243 to control just one of the projectors included in the projector group corresponding to the first adjustment target image out of the plurality of projector groups 101 through 102 to thereby approximate the brightness of the first adjustment target image to the brightness of the dark image.

According to this aspect, since it is sufficient to control just one of the projectors, the control of the projector becomes easy and it is possible to shorten the time necessary for the adjustment.

The color estimation section 244 makes the plurality of projectors 1A through 1D project the red image to estimate the values of the colors of the plurality of red images displayed on the display surface 3. The color average calculation section 245 obtains the average of the values of the colors of the plurality of red images based on a result of the estimation of the values of the colors. The color control section 247 identifies the second adjustment target image showing the value of the color different from the average of the values of the colors of the plurality of red images from the plurality of red images, and then controls the projector for projecting the second adjustment target image to thereby approximate the value of the color of the second adjustment target image to the average of the values of the colors of the plurality of red images.

According to this aspect, since the target value of the color is the average of the colors of the plurality of red images, it is possible to reduce the degree of the change of the color of the second adjustment target image.

A part of the first area 31 overlaps a part of the second area 32. Therefore, it is possible to form a single image using the first composite image E1 and the second composite image E2.

B: Modified Examples

Some aspects of the modifications of the embodiment illustrated hereinabove will be illustrated blow. It is also possible to arbitrarily combine two or more aspects arbitrarily selected from the following illustrations with each other within a range in which the aspects do not conflict with each other.

B1: First Modified Example

In the first embodiment, it is possible for the color average calculation section 245 to select the red images having the values of the allowable colors in the plurality of red images as the selected images based on the result of the estimation of the values of the colors, and then obtain the average of the values of the colors of the selected images. When the range of the value of the allowable color is stored in the second storage section 23, the color average calculation section 245 selects the red images having the values of the colors belonging to the range of the value of the allowable color stored in the second storage section 23 from the plurality of red images as the selected images.

In this case, the color control section 247 identifies the second adjustment target image showing the value of the color different from the average of the values of the colors of the selected images from the plurality of red images, and then controls the projector for projecting the second adjustment target image to thereby approximate the value of the color of the second adjustment target image to the average of the values of the colors of the selected images.

According to this aspect, it is possible to eliminate the red image not having the value of the allowable color, for example, the red image low in image quality projected by the projector in which a failure occurs in the image processing, from the images for determining the target value of the color.

B2: Second Modified Example

In the first modified example, it is possible for the instruction section 248 to identify a nonselected image different from the selected image from the plurality of red images. In this case, it is desirable for the instruction section 248 to make the projector for projecting the nonselected image project an image for calling attention to the user. The image calling attention to the user is an image representing characters such as "please replace." The image calling attention to the user is not limited to the image representing the characters of "please replace." For example, the image calling attention to the user can be an image representing characters of "please repair," or a still image representing a replacement work. According to this aspect, it becomes possible to inform the user of the projector in which the failure occurs.

B3: Third Modified Example

In the first embodiment, when each of the first projector 1A through the fourth projector 1D projects the image based on the image signal in the circumstance in which the user-set correction data to be set by the user has not been set, it is possible for each of the first projector 1A through the fourth projector 1D to correct the image signal based on the initial correction data set in advance to thereby generate the first correction image signal, and then project the image having the value of the color represented by the first correction image signal. Here, the initial correction data is the data set before shipment in order to correct the difference in color of the projection image caused by the individual difference between the projectors 1A through 1D.

Further, when each of the projectors 1A through 1D projects the image based on the image signal in the circumstance in which the user-set correction data has been set, it is possible for each of the projectors 1A through 1D to correct the image signal based on the initial correction data and the user-set correction data to thereby generate the second correction image signal, and then project the image having the value of the color represented by the second correction image signal.

In this case, it is possible for the color average calculation section 245 to obtain an average of the values of the colors represented by the first correction image signals respectively generated by the projectors 1A through 1D. The color estimation section 244 makes the plurality of projectors 1A through 1D project the image based on the red image signal to estimate the values of the colors of the plurality of images displayed on the display surface 3. It is possible for the color control section 247 to identify the second adjustment target image showing the value of the color different from the average of the values of the colors represented by the first correction image signals out of the plurality of images, and then control the projector for projecting the second adjustment target image to thereby approximate the value of the color of the second adjustment target image to the average of the values of the colors represented by the first correction image signals.

It is possible for the color average calculation section 245 to collect in advance the first correction image signals respectively generated by the plurality of projectors 1A through 1D, or collect the initial correction data from each of the projectors 1A through 1D.

When collecting the initial correction data, the color average calculation section 245 corrects the red image signal based on the initial correction data to thereby generate the first correction image signal for each of the projectors 1A through 1D. Subsequently, the color average calculation section 245 calculates an average of the colors represented by the first correction image signals respectively generated by the projectors 1A through 1D.

The color average calculation section 245 collects the initial correction data in, for example, the following manner.

The color average calculation section 245 transmits an initial correction data request for requesting the initial correction data from the second communication section 22 to each of the projectors 1A through 1D. The color average calculation section 245 receives the initial correction data from each of the projectors 1A through 1D via the second communication section 22 as a response to the initial correction data request.

According to this aspect, even when, for example, the color of the image projected by the first projector 1A has been changed with the user-set correction data in the preference of a certain user, it is possible to determine the target value of the color without being affected by the change.

B4: Fourth Modified Example

In the first embodiment, it is possible for the color control section 247 to identify a selected image projected by a selected projector as any one of the projectors 1A through 1D out of the plurality of red images. The selected projector is designated by, for example, the user in advance. The color control section 247 identifies the second adjustment target image showing the value of the color different from the value of the color of the selected image from the plurality of red images, and then controls the projector for projecting the second adjustment target image to thereby approximate the value of the color of the second adjustment target image to the value of the color of the selected image.

According to this aspect, the process of calculating the average can be made unnecessary. Therefore, it is possible to eliminate the color average calculation section 245.

B5: Fifth Modified Example

In the first embodiment, when each of the projectors 1A through 1D is the projector shown in the third modified example, it is possible for the color control section 247 to identify the second adjustment target image showing the value of the color different from the value of the color represented by the first correction image signal generated by the selected projector as any one of the projectors 1A through 1D from the plurality of red images displayed on the display surface 3 by the plurality of projectors 1A through 1D projecting the image based on the red image signal. The color control section 247 controls the projector for projecting the second adjustment target image to thereby approximate the value of the color of the second adjustment target image to the value of the color represented by the first correction image signal generated by the selected projector.

In this case, the color control section 247 recognizes the value of the color represented by the first correction image signal using substantially the same method as in the third modified example.

According to this aspect, even when, for example, the color of the image projected by a projector different from the selected projector has been changed in the preference of a certain user, it is possible to determine the target value of the color without being affected by the change. Further, the process of calculating the average can be made unnecessary. Therefore, it is possible to eliminate the color average calculation section 245.

B6: Sixth Modified Example

In the fourth modified example or the fifth modified example, it is possible for the color estimation section 244 or the color control section 247 to automatically determine the selected projector. For example, the color estimation section 244 or the color control section 247 automatically determines the selected projector at random.

According to this aspect, since the selected projector is automatically determined, it is possible to save the user's trouble of designating the selected projector.

B7: Seventh Modified Example

In the fourth modified example through the sixth modified example, the shift amount of the projection lens in the selected projector can be smaller than the shift amount of the projection lens in the projectors other than the selected projector out of the plurality of projectors 1A through 1D. For example, in the sixth modified example, the color control section 247 obtains shift amount information representing the shift amount of the projection lens from each of the projectors 1A through 1D after the completion of the estimation process of the value of the color by the color estimation section 244. The color control section 247 identifies the selected projector using the shift amount information obtained from each of the projectors 1A through 1D. The smaller the shift amount of the projection lens is, the higher the possibility that the projector is located at the front of the display surface 3 is. Therefore, according to this aspect, it becomes possible to use the projector high in possibility of being located at the front of the display surface 3 as the selected projector.

B8: Eighth Modified Example

In the first embodiment and the first through seventh modified examples, in the period of estimating the brightness of each of the composite images, it is desirable for the brightness estimation section 241 to alternatively make the plurality of projector groups 101 through 102 project the white image, and make the projector group not projecting the white image out of the plurality of projector groups 101 through 102 project the black image.

According to this aspect, it is possible to speed up the operation of the projector group not projecting the white image since the power supply to the projector group not projecting the white image can be kept compared to the configuration in which the power supply to the projector group not projecting the white image out of the plurality of projector groups 101 through 102 is stopped and is then executed.

B9: Ninth Modified Example

In the first embodiment and the first through eighth modified examples, it is possible for the brightness estimation section 241 to transmit the instruction of projecting the white image to the first projector 1A through the fourth projector 1D at respective timings different from each other. In this case, the brightness estimation section 241 makes the first projector 1A through the fourth projector 1D take the white images projected by the first projector 1A through the fourth projector 1D at respective timings different from each other. It is possible for the brightness estimation section 241 to firstly estimate the brightness for each of the white images using the plurality of imaging data generated by performing the imaging at the respective timings different from each other, and then estimate the brightness of the first situation image E11 and the brightness of the second situation image E22 using the result of the estimation. For example, the brightness estimation section 241 estimates the brightness which can be obtained by adding the brightness of the white image projected by the first projector 1A to the brightness of the white image projected by the second projector 1B, as the brightness of the first situation image E11. Further, the brightness estimation section 241 estimates the brightness which can be obtained by adding the brightness of the white image projected by the third projector 1C to the brightness of the white image projected by the fourth projector 1D, as the brightness of the second situation image E22.

B10: Tenth Modified Example

Although the liquid crystal light valves 145 are used as an example of the light modulation device in the projector 1 in the first embodiment and the first through ninth modified examples, the light modulation device is not limited to the liquid crystal light valves, and can arbitrarily be changed. For example, it is also possible for the light modulation device to have a configuration using three reflective liquid crystal panels. Further, it is also possible for the light modulation device to have a configuration such as a system using a single liquid crystal panel, a system using three digital mirror devices (DMD), or a system using a single digital mirror device. When using just one liquid crystal panel or DMD as the light modulation device, the members corresponding to the color separation optical system and the color combining optical system are unnecessary. Further, besides the liquid crystal panel or the DMD, any configurations capable of modulating the light emitted by the light source 144 can be adopted as the light modulation device.

B11: Eleventh Modified Example

In the first embodiment and the first through tenth modified examples, it is possible to perform imaging of all of the images by a single camera 15. In this case, the single camera 15 can be installed in any one of the first projector 1A through the fourth projector 1D, or is not required to be installed in any of the projectors.

B12: Twelfth Modified Example

In the first embodiment and the first through eleventh modified examples, it is possible for the instruction section 248 to transmit the pattern image data instead of the pattern projection instruction. In this case, the operation control section 171 in the projector 1 outputs the pattern image data transmitted from the instruction section 248 to the image processing section 141.

In the first embodiment and the first through eleventh modified examples, it is possible for the brightness estimation section 241 to transmit the white image data instead of the instruction of projecting the white image. In this case the operation control section 171 in the projector 1 outputs the white image data transmitted from the brightness estimation section 241 to the image processing section 141.

In the first embodiment and the first through eleventh modified examples, it is possible for the color estimation section 244 to transmit the red image data instead of the instruction of projecting the red image. In this case, the operation control section 171 in the projector 1 outputs the red image data transmitted from the color estimation section 244 to the image processing section 141.

In the first embodiment and the first through eleventh modified examples, it is possible for the brightness estimation section 241 to transmit the black image data instead of the instruction of projecting the black image. In this case, the operation control section 171 in the projector 1 outputs the black image data transmitted from the instruction section 248 to the image processing section 141.

What is claimed is:

1. A method of controlling a display system including a plurality of projectors divided into a plurality of projector groups and a control device, the method comprising:
   projecting, by a plurality of group-belonging projectors included in one projector group out of the plurality of projector groups, an image in one display area corresponding to the one projector group out of a plurality of display areas to thereby display one composite image corresponding to the one projector group out of a plurality of composite images corresponding one-to-one to the plurality of projector groups in the one display area;
   making, by the control device, the plurality of projectors project a first image to estimate brightness of each of the composite images;
   identifying, by the control device, a dark image which is darkest and a first adjustment target image different from the dark image from the plurality of composite images based on a result of the brightness estimation; and
   controlling, by the control device, at least one projector included in the projector group corresponding to the first adjustment target image out of the plurality of projector groups to thereby approximate brightness of the first adjustment target image to brightness of the dark image.

2. The method of controlling the display system according to claim 1, wherein
   the control device controls just one projector included in the projector group corresponding to the first adjustment target image out of the plurality of projector groups to thereby approximate the brightness of the first adjustment target image to the brightness of the dark image.

3. The method of controlling the display system according to claim 1, wherein
   the control device
     makes the plurality of projectors project a second image having a solid color to estimate values of colors of the plurality of second images displayed on a display surface including the plurality of display areas,
     obtains an average of the values of the colors of the plurality of second images based on a result of the estimation of the values of the colors, and
     identifies a second adjustment target image showing a value of a color different from the average out of the plurality of second images, and controls the projector configured to project the second adjustment target image to thereby approximate the value of the color of the second adjustment target image to the average.

4. The method of controlling the display system according to claim 1, wherein the control device makes the plurality of projectors project a second image having a solid color to estimate values of colors of the plurality of second images displayed on a display surface including the plurality of display areas, selects the second images having a value of an allowable color out of the plurality of second images as selected images based on a result of the estimation of the values of the colors, obtains an average of the values of the colors of the selected images, and identifies a second adjustment target image showing a value of a color different from the average out of the plurality of second images, and controls the projector configured to project the second adjustment target image to thereby approximate the value of the color of the second adjustment target image to the average.

5. The method of controlling the display system according to claim 4, wherein the control device identifies a nonselected image different from the selected images out of the plurality of second images, and makes the projector configured to project the nonselected image project an image configured to call attention to a user.

6. The method of controlling the display system according to claim 1, wherein each of the projectors corrects an image signal representing a second image having a solid color based on initial correction data set in advance to thereby generate a first correction image signal, and then projects an image having a value of a color represented by the first correction image signal when projecting an image based on the image signal in a circumstance in which user-set correction data to be set by a user is not set, and corrects the image signal based on the initial correction data and the user-set correction data to thereby generate a second correction image signal, and then projects an image having a value of a color represented by the second correction image signal when projecting an image based on the image signal in a circumstance in which the user-set correction data is set, and the control device obtains an average of values of colors represented by the first correction image signals respectively generated by the projectors, makes the plurality of projectors project an image based on the image signal to estimate values of colors of the plurality of images to be displayed on a display surface including the plurality of display areas, and identifies a second adjustment target image showing a value of a color different from the average out of the plurality of images, and controls the projector configured to project the second adjustment target image to thereby approximate the value of the color of the second adjustment target image to the average.

7. The method of controlling the display system according to claim 1, wherein the control device makes the plurality of projectors project a second image having a solid color to estimate values of colors of the plurality of second images displayed on a display surface including the plurality of display areas, identifies a selected image projected by a selected projector as any one the projectors out of the plurality of second images, and identifies a second adjustment target image showing a value of a color different from the value of the color of the selected image from the plurality of second images, and then controls the projector configured to project the second adjustment target image to thereby approximate the value of the color of the second adjustment target image to the value of the color of the selected image.

8. The method of controlling the display system according to claim 1, wherein each of the projectors corrects an image signal representing a second image having a solid color based on initial correction data set in advance to thereby generate a first correction image signal, and then projects an image having a value of a color represented by the first correction image signal when projecting an image based on the image signal in a circumstance in which user-set correction data to be set by a user is not set, and corrects the image signal based on the initial correction data and the user-set correction data to thereby generate a second correction image signal, and then projects an image having a value of a color represented by the second correction image signal when projecting an image based on the image signal in a circumstance in which the user-set correction data is set, and the control device makes the plurality of projectors project an image based on the image signal to estimate values of colors of the plurality of images to be displayed on a display surface including the plurality of display areas, and identifies a second adjustment target image showing a value of a color different from a value of a color represented by the first correction image signal generated by a selected projector as any one of the projectors out of the plurality of images, and then controls the projector configured to project the second adjustment target image to thereby approximate the value of the color of the second adjustment target image to the value of the color represented by the first correction image signal generated by the selected projector.

9. The method of controlling the display system according to claim 7, wherein the control device determines the selected projector.

10. The method of controlling the display system according to claim 7, wherein each of the projectors has a projection lens which can be shifted, and a shift amount of the projection lens in the selected projector is smaller than a shift amount of the projection lens in a projector other than the selected projector out of the plurality of projectors.

11. The method of controlling the display system according to claim 1, wherein
in a period of estimating the brightness of each of the composite images, the control device alternatively makes the projector groups project the first image, and makes the projector group not projecting the first image project a black image out of the plurality of projector groups.

12. A method of controlling a display system including a first projector, a second projector, a third projector, and a fourth projector, the method comprising:
projecting, by the first projector, a first projection image with first brightness in a first area based on a first image signal;
projecting, by the second projector, a second projection image with second brightness in the first area based on the first image signal;
projecting, by the third projector, a third projection image with third brightness in a second area based on the first image signal;
projecting, by the fourth projector, a fourth projection image with fourth brightness in the second area based on the first image signal;
displaying a first composite image in the first area with fifth brightness brighter than the first brightness and the second brightness with the first projection image and the second projection image;
displaying a second composite image in the second area with sixth brightness brighter than the third brightness and the fourth brightness with the third projection image and the fourth projection image;
projecting, by the first projector and the second projector, the first composite image with the sixth brightness when the second composite image is darker than the first composite image; and
projecting, by the third projector and the fourth projector, the second composite image with the fifth brightness when the first composite image is darker than the second composite image.

13. The method of controlling the display system according to claim 12, wherein
a part of the first area overlaps a part of the second area.

14. A control device configured to control a display system which includes a plurality of projectors divided into a plurality of projector groups, and in which a plurality of group-belonging projectors included in one projector group out of the plurality of projector groups projects an image in one display area corresponding to the one projector group out of a plurality of display areas to thereby display one composite image corresponding to the one projector group out of a plurality of composite images corresponding one-to-one to the plurality of projector groups in the one display area, the control device comprising:
one or more processors configured to execute a program to cause the control device to:
make the plurality of projectors project a first image to estimate brightness of each of the composite images;
identify a dark image which is darkest and a first adjustment target image different from the dark image from the plurality of composite images based on a result of the brightness estimation; and
control at least one projector included in the projector group corresponding to the first adjustment target image out of the plurality of projector groups to thereby approximate brightness of the first adjustment target image to brightness of the dark image.

\* \* \* \* \*